(12) United States Patent
Nakakura (10) Patent No.: US 9,994,208 B2
(45) Date of Patent: Jun. 12, 2018

(54) BICYCLE HOSE STRUCTURE

(71) Applicant: SHIMANO INC., Sakai (JP)

(72) Inventor: Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 294 days.

(21) Appl. No.: 14/186,049

(22) Filed: Feb. 21, 2014

(65) Prior Publication Data
US 2015/0239449 A1 Aug. 27, 2015

(51) Int. Cl.
| | |
|---|---|
| B60T 17/04 | (2006.01) |
| B62L 3/00 | (2006.01) |
| H01B 7/00 | (2006.01) |
| B62J 99/00 | (2009.01) |
| F16L 11/127 | (2006.01) |

(52) U.S. Cl.
CPC .............. B60T 17/043 (2013.01); B62L 3/00 (2013.01); H01B 7/0072 (2013.01); B62J 2099/002 (2013.01); B62J 2099/004 (2013.01); B62J 2099/0046 (2013.01); B62K 2207/00 (2013.01); F16L 11/127 (2013.01)

(58) Field of Classification Search
CPC .............................. H01B 7/0072; F16L 11/127
USPC ......................................................... 174/47
See application file for complete search history.

(56) References Cited

U.S. PATENT DOCUMENTS

| | | | | |
|---|---|---|---|---|
| 3,580,983 A | * | 5/1971 | Jackson ................ | F16L 11/127 174/47 |
| 7,604,435 B2 | * | 10/2009 | Mjelstad ................... | D07B 1/12 174/113 C |
| 7,861,746 B2 | * | 1/2011 | Zimmer .................. | F16L 9/125 138/125 |
| 8,944,471 B2 | * | 2/2015 | Rodenburg ........... | F16L 11/127 285/222.1 |
| 2006/0042712 A1 | * | 3/2006 | Iio ........................... | F16L 11/04 138/137 |
| 2006/0196252 A1 | * | 9/2006 | Deckard ............... | F16L 11/127 73/49.5 |
| 2007/0102845 A1 | * | 5/2007 | Dodwell ............... | B29C 39/021 264/272.11 |
| 2013/0099026 A1 | * | 4/2013 | Mauchle ............... | B05B 7/1404 239/600 |
| 2013/0158544 A1 | * | 6/2013 | Kuhner .............. | A61B 17/3203 606/39 |
| 2015/0112305 A1 | * | 4/2015 | Katase ................ | A61M 5/5086 604/508 |
| 2015/0129075 A1 | * | 5/2015 | Walsh ...................... | F16L 11/00 138/103 |

(Continued)

FOREIGN PATENT DOCUMENTS

| | | |
|---|---|---|
| CH | 201708 | 12/1938 |
| DE | 20 2007 010 468 U1 | 11/2008 |

*Primary Examiner* — Hoa C Nguyen
*Assistant Examiner* — Stanley Tso
(74) *Attorney, Agent, or Firm* — Mori & Ward, LLP (57) ABSTRACT

A bicycle hose structure comprises a tubular main body and a first electrical conductor. The tubular main body defines a through-hole, an inner peripheral surface and an outer peripheral surface. The through-hole is configured to arrange a force transmitting element provided so as to transmit operating force. The first electrical conductor is provided at least radially inwardly of the outer peripheral surface and has an end portion configured to be electrically connected to a bicycle component.

28 Claims, 7 Drawing Sheets

(56) References Cited

U.S. PATENT DOCUMENTS

2015/0226362 A1\* 8/2015 Brudevold ............... B67D 7/78
138/33

\* cited by examiner

BICYCLE HOSE STRUCTURE

BACKGROUND OF THE INVENTION

Field of the Invention

The present invention relates to a bicycle hose structure.

Discussion of the Background

Bicycling is becoming an increasingly more popular form of recreation and competition as well as a means of transportation. Whether the bicycle is used for recreation, transportation or competition, the bicycle industry is constantly improving the various components of the bicycle. In recent years, some bicycles are provided with mechanical bicycle components and electrical bicycle components. The mechanical bicycle component is mechanically connected to a mechanical operating device via a hose element such as a hydraulic hose or a mechanical cable. The electric bicycle component is electrically connected to an electrical operating device via an electrical cable separated from the hose element.

SUMMARY OF THE INVENTION

In accordance with a first aspect of the present invention, a bicycle hose structure comprises a tubular main body and a first electrical conductor. The tubular main body defines a through-hole, an inner peripheral surface and an outer peripheral surface. The through-hole is configured to arrange a force transmitting element provided so as to transmit operating force. The first electrical conductor is provided at least radially inwardly of the outer peripheral surface and has an end portion configured to be electrically connected to a bicycle component.

In accordance with a second aspect of the present invention, the bicycle hose structure according to the first aspect is configured so that the first electrical conductor is provided on the inner peripheral surface of the tubular main body.

In accordance with a third aspect of the present invention, the bicycle hose structure according to the second aspect is configured so that the first electrical conductor is bonded to the inner peripheral surface.

In accordance with a fourth aspect of the present invention, the bicycle hose structure according to the second aspect is configured so that the first electrical conductor comprises a first conductive film provided on the inner peripheral surface to cover the inner peripheral surface.

In accordance with a fifth aspect of the present invention, the bicycle hose structure according to the second aspect further comprises a second electrical conductor radially outwardly provided with respect to the first electrical conductor to be electrically insulated from the first electrical conductor by the tubular main body.

In accordance with a sixth aspect of the present invention, the bicycle hose structure according to the fifth aspect is configured so that the second electrical conductor is provided on the outer peripheral surface of the tubular main body.

In accordance with a seventh aspect of the present invention, the bicycle hose structure according to the fifth aspect is configured so that the second electrical conductor comprises a second conductive film provided on the outer peripheral surface to cover the outer peripheral surface.

In accordance with an eighth aspect of the present invention, the bicycle hose structure according to the first aspect is configured so that the first electrical conductor is at least partially embedded in the tubular main body.

In accordance with a ninth aspect of the present invention, the bicycle hose structure according to the first aspect is configured so that the first electrical conductor comprises a tubular member. The tubular main body is configured to radially outwardly cover the first electrical conductor.

In accordance with a tenth aspect of the present invention, the bicycle hose structure according to the first aspect is configured so that the through-hole comprises a fluid passageway through which hydraulic fluid is to transmit the operating force as the force transmitting element.

In accordance with an eleventh aspect of the present invention, the bicycle hose structure according to the tenth aspect further comprises an attachment member configured to be attached to an end portion of the tubular main body and to be electrically connected to the first electrical conductor.

In accordance with a twelfth aspect of the present invention, the bicycle hose structure according to the eleventh aspect is configured so that the attachment member includes an interior passageway configured to fluidly communicate with the fluid passageway in a state where the attachment member is attached to the end portion of the tubular main body.

In accordance with a thirteenth aspect of the present invention, the bicycle hose structure according to the first aspect is configured so that the through-hole comprises a wire passageway through which a mechanical operation wire is to extend to transmit the operating force as the force transmitting element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
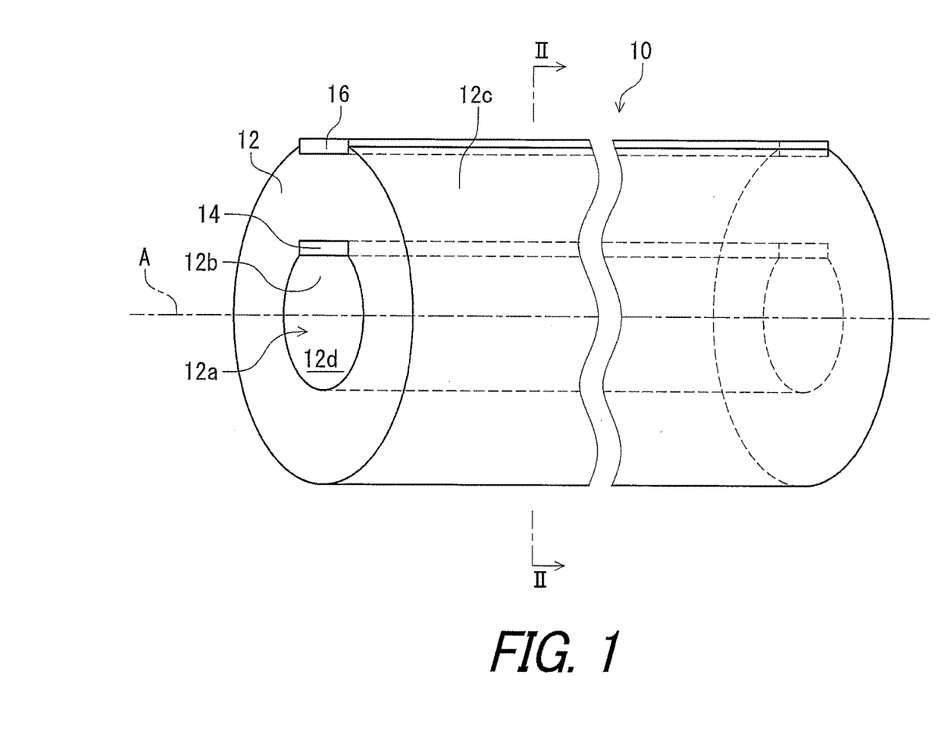
FIG. 1 is a perspective view of a bicycle hose structure in accordance with a first embodiment.

Referring initially to FIG. 1, a bicycle hose structure 10 in accordance with a first embodiment is illustrated. The bicycle hose structure 10 comprises a tubular main body 12 and a first electrical conductor 14. The tubular main body 12 defines a through-hole 12a, an inner peripheral surface 12b and an outer peripheral surface 12c. The through-hole 12a is configured to arrange a force transmitting element provided so as to transmit operating force. In the illustrated embodiment, the through-hole 12a comprises a fluid passageway 12d through which hydraulic fluid is to transmit the operating force as the force transmitting element. Namely, the bicycle hose structure 10 can be used as a hose element such as a hydraulic hose. The tubular main body 12 is made of electrical insulation material such as rubber. The tubular main body 12 has a center axis A. The first electrical conductor 14 extends along the center axis A of the tubular main body 12. The first electrical conductor 14 is made of electrically conductive material such as electrically conductive metal, more in detail such as a copper alloy or an aluminum alloy. The first electrical conductor 14 can be a metallic plate or a metallic tape, for example.

Figure 2:
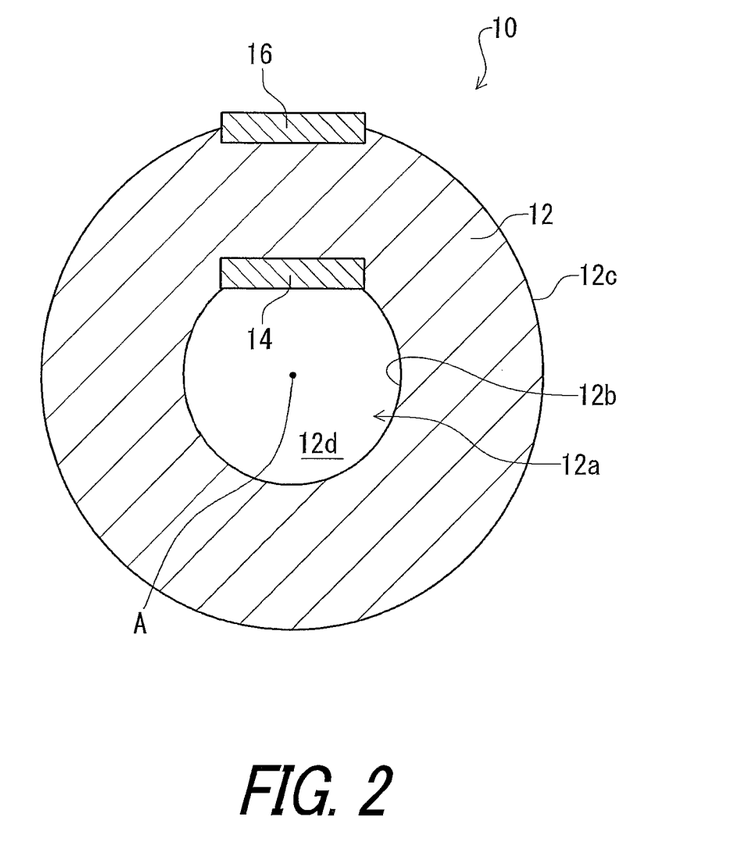
FIG. 2 is a cross-sectional view of the bicycle hose structure take along line II-II of FIG. 1.

As seen in FIG. 2, the first electrical conductor 14 is provided at least radially inwardly of the outer peripheral surface 12c. In the illustrated embodiment, the first electrical conductor 14 is provided on the inner peripheral surface 12b of the tubular main body 12. The first electrical conductor 14 is bonded to the inner peripheral surface 12b. The first electrical conductor 14 is at least partially embedded in the tubular main body 12. For example, the first electrical conductor 14 is integrally formed with the tubular main body 12 using an insert molding. Alternatively, the first electrical conductor 14 can be bonded to the inner peripheral surface 12b with adhesive. The first electrical conductor 14 is as least partially exposed in the through-hole 12a. Hence, in this first embodiment, the first electrical conductor 14 constructs part of the fluid passageway 12d. The first electrical conductor 14 serves as a anode ray. The first electrical conductor 14 serves as the signal line if needed and/or desired.

As seen in FIG. 2, the bicycle hose structure 10 further comprises a second electrical conductor 16 radially outwardly provided with respect to the first electrical conductor 14 to be electrically insulated from the first electrical conductor 14 by the tubular main body 12. In the illustrated embodiment, the second electrical conductor 16 is provided on the outer peripheral surface 12c of the tubular main body 12. The second electrical conductor 16 is bonded to the outer peripheral surface 12c. The second electrical conductor 16 is at least partially embedded in the tubular main body 12. For example, the second electrical conductor 16 is integrally formed with the tubular main body 12 using an insert molding. Alternatively, the second electrical conductor 16 can be bonded to the outer peripheral surface 12c with adhesive. The second electrical conductor 16 is as least partially exposed outside the tubular main body 12. The second electrical conductor 16 serves as a ground line. The second electrical conductor 16 can be entirely embedded in the tubular main body 12 if desired.

As seen in FIG. 1, the second electrical conductor 16 extends along the center axis A of the tubular main body 12. The second electrical conductor 16 is made of electrically conductive material such as electrically conductive metal, more in detail such as a copper alloy or an aluminum alloy. The second electrical conductor 16 can be a metallic plate or a metallic tape, for example. The second electrical conductor 16 is used for a cathode ray. The second electrical conductor 16 can be omitted from the bicycle hose structure 10 if the first electrical conductor 14 is served as the signal line.

As seen in FIGS. 1 and 2, the first electrical conductor 14 is provided between the center axis A and the second electrical conductor 16. The positional relationship between the first electrical conductor 14 and the second electrical conductor 16 is not limited to the illustrated embodiment. For example, the first electrical conductor 14 can be provided on an opposite side of the second electrical conductor 16 with respect to the center axis A if needed and/or desired.

Figure 3:
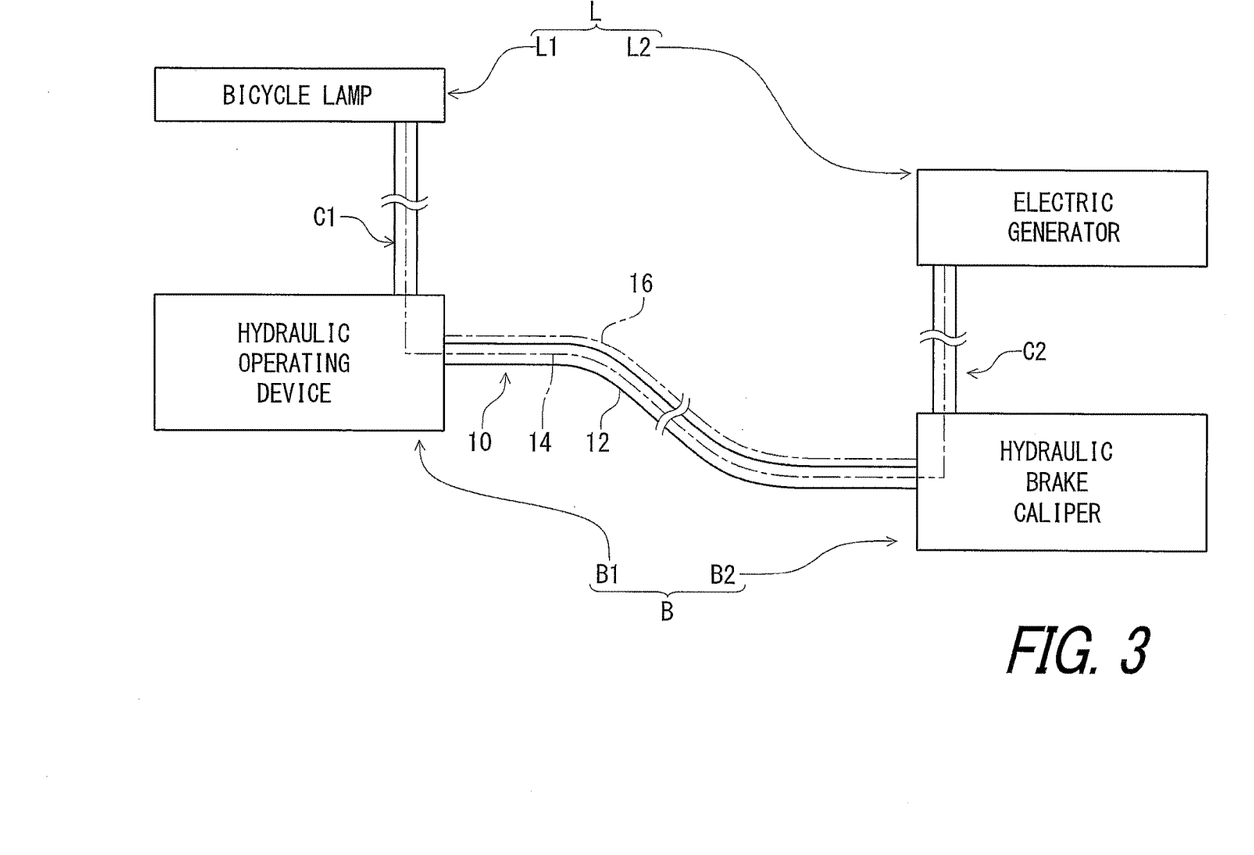
FIG. 3 is a schematic diagram showing a bicycle brake system and a bicycle lighting system which are connected to each other via the bicycle hose structure illustrated in FIG. 1.

Referring to FIG. 3, one example of applications of the bicycle hose structure 10 will be described. As seen in FIG. 3, the bicycle hose structure 10 can be applied to a bicycle brake system B and a bicycle lighting system L as both a hydraulic hose and an electric wire. The bicycle brake system B includes a hydraulic operating device B1 and a hydraulic brake caliper B2. The bicycle lighting system L includes a bicycle lamp L1 and an electric generator L2 (e.g., a hub dynamo). The hydraulic operating device B1 is fluidly connected to the hydraulic brake caliper B2 via the bicycle hose structure 10. The bicycle lamp L1 is electrically connected to the electric generator L2 via the bicycle hose structure 10, a first electrical cable C1 and a second electrical cable C2. The first electrical conductor 14 is electrically connected to the first electrical cable C1 and the second electrical cable C2. Since the bicycle brake system B and the bicycle lighting system L include well known structures in the bicycle field, they will not be described and/or illustrated in detail here for the sake of brevity.

Figure 4:
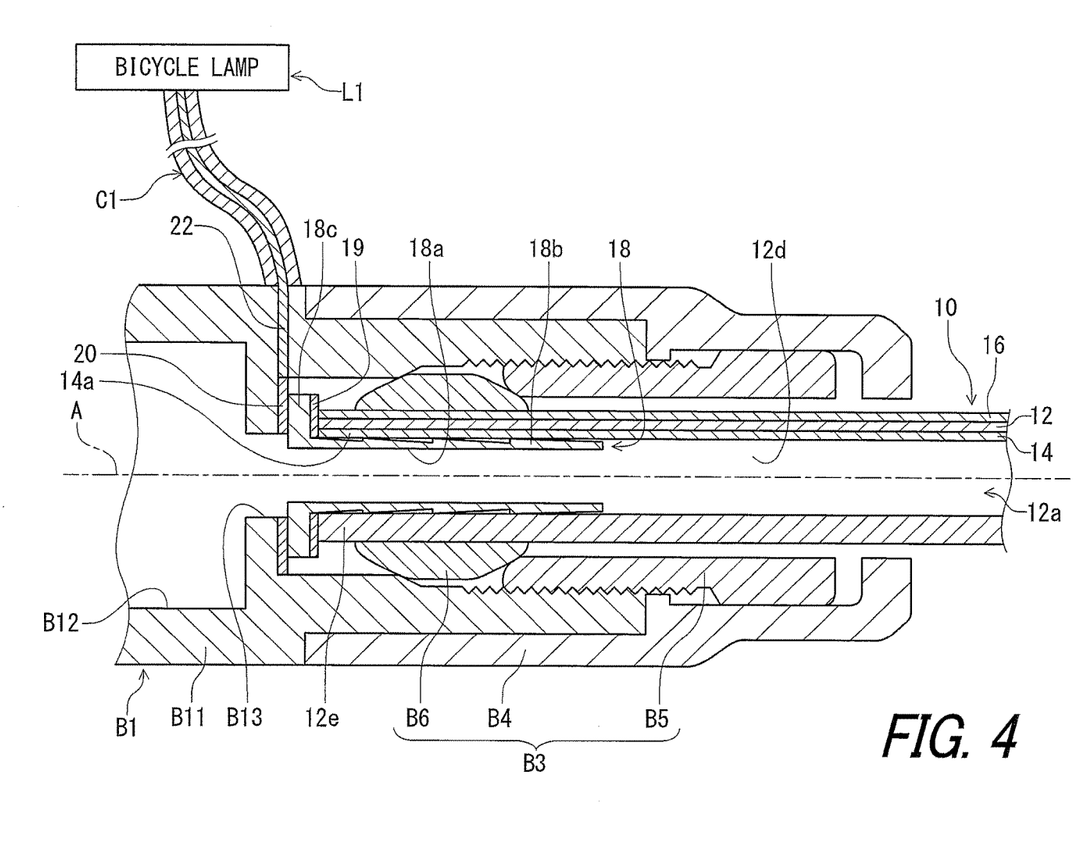
FIG. 4 is a cross-sectional view of a connecting structure between a hydraulic operating device and the bicycle hose structure illustrated in FIG. 1.

As seen in FIG. 4, one end of the bicycle hose structure 10 is connected with the hydraulic operating device B1 using a hydraulic hose fitting B3. The hydraulic hose fitting B3 includes a cover B4, a connecting fastener B5 and a tubular bushing B6. The one end of the bicycle hose structure 10 is inserted in the cover B4, the connecting fastener B5 and the tubular bushing B6. The connecting fastener B5 is fastened to a housing B11 of the hydraulic operating device B1. The connecting fastener B5 and the tubular bushing B6 are made of electrically conductive material such as copper or a copper alloy. The connecting fastener B5 and the tubular bushing B6 are in contact with the second electrical conductor 16. The connecting fastener B5 and the tubular bushing B6 can serve as a part of the ground line. The cover B4 is attached to the housing B11 of the hydraulic operating device B1. The cover B4 and the housing B11 are made of material having electric insulation. For example, the cover B4 is made of electrical insulation material such as rubber, and the housing B11 is made of electrical insulation material such as resin material having electric insulation. By screwing the connecting fastener B5 into the housing B11, the tubular bushing B6 is compressed in an axial direction and fixed onto the bicycle hose structure 10 to prevent removing the hose structure 10 from the housing B11. Since this attachment construction is well known in the bicycle field, it will be not described in detail here for the sake of brevity.

The first electrical conductor 14 has an end portion 14a configured to be electrically connected to a bicycle component. In the illustrated embodiment, the end portion 14a of the first electrical conductor 14 is electrically connected to the bicycle lamp L1. More specifically, the bicycle hose structure 10 further comprises an attachment member 18 configured to be attached to an end portion 12e of the tubular main body 12 and to be electrically connected to the first electrical conductor 14. In the illustrated embodiment, the attachment member 18 includes an interior passageway 18a configured to fluidly communicate with the fluid passageway 12d in a state where the attachment member 18 is attached to the end portion 12e of the tubular main body 12. The fluid passageway 12d is in fluid communication with a master cylinder B12 of the housing B11 via the interior passageway 18a and a fluid opening B13 of the housing B11 in state where the bicycle hose structure 10 is connected to the hydraulic operating device B1.

As seen in FIG. 4, the attachment member 18 is in contact with the end portion 14a of the first electrical conductor 14 in a state where the attachment member 18 is attached to the end portion 12e of the tubular main body 12. More specifically, the attachment member 18 includes an insertion portion 18b and a flange portion 18c. The insertion portion 18b has a cylindrical shape and defines the interior passageway 18a. The insertion portion 18b is inserted in the bicycle hose structure 10 and is in contact with the first electrical conductor 14. The flange portion 18c is provided at an end of the insertion portion 18b. The attachment member 18 is made of electrically conductive material such as electrically conductive metal, more in detail such as a copper alloy or an aluminum alloy.

An insulating member 19 is provided between the flange portion 18c and the second electrical conductor 16 to electrically insulate the attachment member 18 from the second electrical conductor 16. The insulating member 19 is attached to the flange portion 18c. The insulating member 19 is bonded to the flange portion 18c with adhesive, for example. The insulating member 19 is made of electrical insulation material such as rubber. The insulating member 19 can be omitted if the attachment member 18 can be spaced apart from the second electrical conductor 16.

As seen in FIG. 4, an additional electrical conductor 20 is provided between the attachment member 18 and the housing B 11. The additional electrical conductor 20 is attached around the fluid opening B13 of the housing B11. The additional electrical conductor 20 is bonded around the fluid opening B13 of the housing B11 with adhesive, for example. The flange portion 18c of the attachment member 18 is in contact with the additional electrical conductor 20. The additional electrical conductor 20 is electrically connected to an additional electric wire 22 provided in the housing B11. The additional electric wire 22 extends from the additional electrical conductor 20 to an outside of the hydraulic operating device B1. The additional electric wire 22 is included the first electrical cable C1 and is electrically connected to the bicycle lamp L1. Since the connecting structures shown in FIG. 4 can be applied to connecting structures between the hydraulic brake caliper B2 and the electric generator L2, they will not be describe and/or illustrated in detail here for the sake of brevity.

As described above, since the bicycle hose structure 10 includes the tubular main body 12 and the first electrical conductor 14, the bicycle hose structure 10 can be used as a hose element and an electrical cable. Accordingly, at least part of an electrical cable can be integrated with a hose element, allowing the wiring arrangement to be simplified in a bicycle.

Second Embodiment

A bicycle hose structure 210 in accordance with a second embodiment will be described below referring to FIG. 5. The bicycle hose structure 210 has the same configuration as the bicycle hose structure 10 except for the structures of the first electrical conductor and the second electrical conductor. Thus, elements having substantially the same function as those in the first embodiment will be numbered the same here, and will not be described again in detail here for the sake of brevity.

Figure 5:
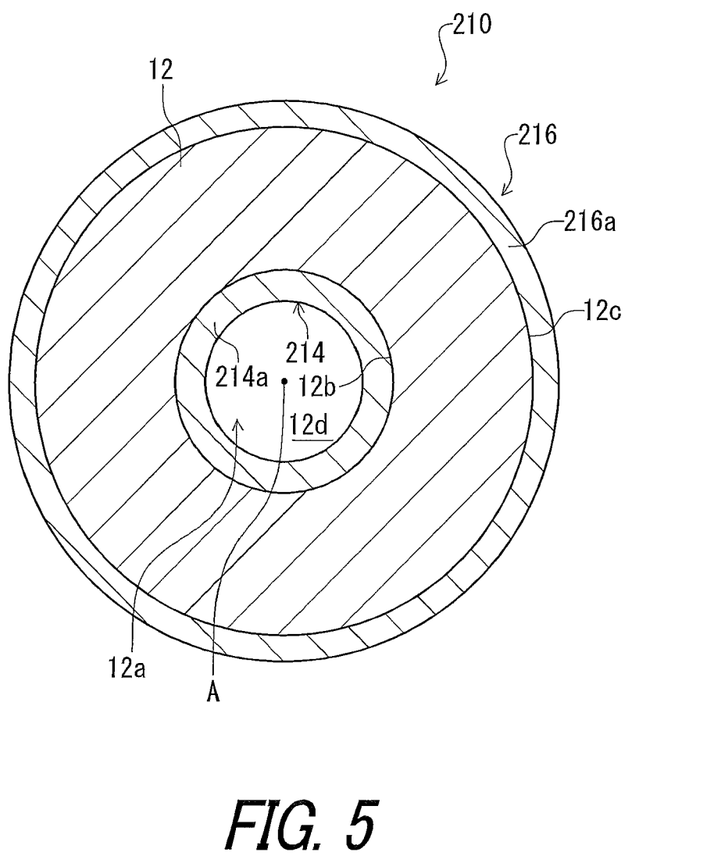
FIG. 5 is a cross-sectional view of a bicycle hose structure in accordance with a second embodiment.

As seen in FIG. 5, the bicycle hose structure 210 comprises the tubular main body 12, a first electrical conductor 214 and a second electrical conductor 216. The first electrical conductor 214 comprises a first conductive film 214a provided on the inner peripheral surface 12b to cover the inner peripheral surface 12b. The first conductive film 214a is provided in the through-hole 12a of the tubular main body 12. The second electrical conductor 216 comprises a second conductive film 216a provided on the outer peripheral surface 12c to cover the outer peripheral surface 12c. The first and second conductive films 214a and 216a are made of electrically conductive material same as the first and second electrical conductors 14 and 16 of the first embodiment.

In other words, the first electrical conductor 214 comprises a tubular member 214a, and the tubular main body 12 is configured to radially outwardly cover the first electrical conductor 214. Furthermore, the second electrical conductor 216 comprises a tubular member 216a, and the second electrical conductor 216 is configured to radially outwardly cover the tubular main body 12. The second electrical conductor 216 can be omitted from the bicycle hose structure 210 if needed and/or desired.

Since the bicycle hose structure 210 includes the tubular main body 212 and the first electrical conductor 214, the bicycle hose structure 210 can be used as a hose element and an electrical cable. Accordingly, at least part of an electrical cable can be integrated with a hose element, allowing the wiring arrangement to be simplified in a bicycle.

Third Embodiment

A bicycle hose structure 310 in accordance with a third embodiment will be described below referring to FIGS. 6 and 7. The bicycle hose structure 310 has the same configuration as the bicycle hose structure 10 except for the structures of the first electrical conductor and the second electrical conductor. Thus, elements having substantially the same function as those in the above embodiments will be numbered the same here, and will not be described again in detail here for the sake of brevity.

Figure 6:
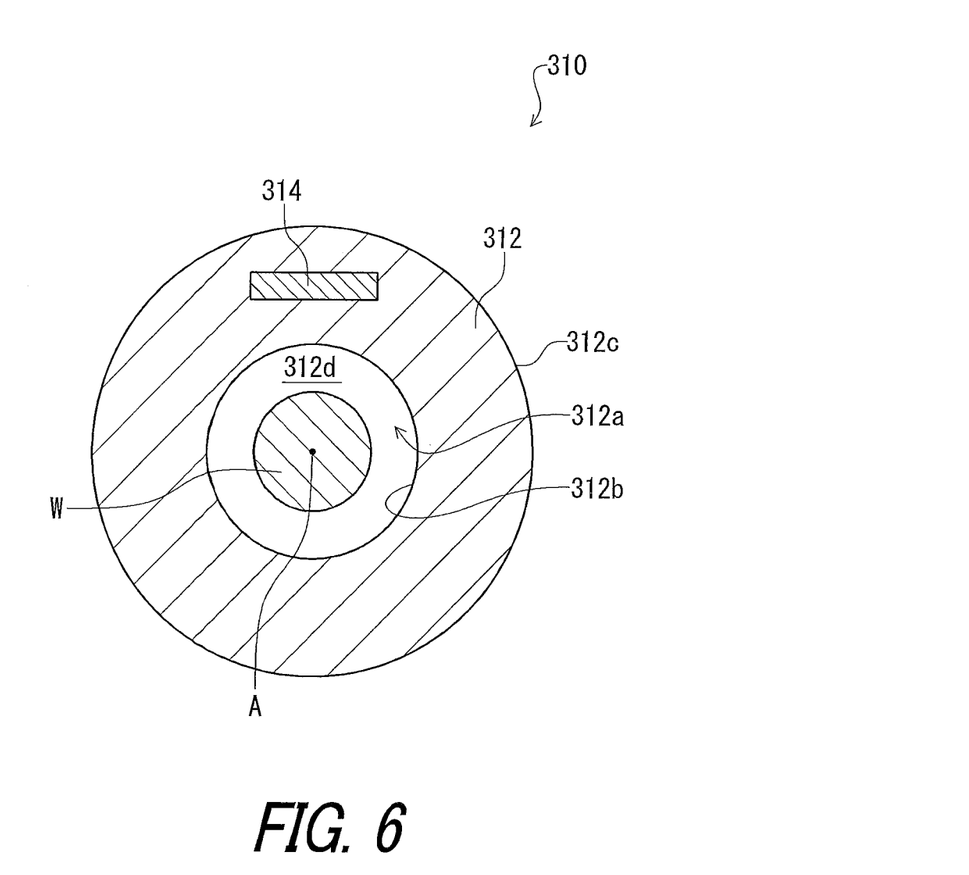
FIG. 6 is a cross-sectional view of a bicycle hose structure in accordance with a third embodiment.

As seen in FIG. 6, the bicycle hose structure 310 comprises a tubular main body 312 and a first electrical conductor 314. The tubular main body 312 defines a through-hole 312a, an inner peripheral surface 412b and an outer peripheral surface 312c. The first electrical conductor 314 is provided at least radially inwardly of the outer peripheral surface 312c and has an end portion 314a configured to be electrically connected to a bicycle component. The through-hole 312a is configured to arrange a force transmitting element provided so as to transmit operating force. In the illustrated embodiment, the through-hole 312a comprises a wire passageway 312d through which a mechanical operation wire W is to extend to transmit the operating force as the force transmitting element. Namely, the bicycle hose structure 310 can be used as a hose element such as a mechanical cable. The first electrical conductor 314 is entirely embedded in the tubular main body 12 not to contact the mechanical operation wire W.

Figure 7:
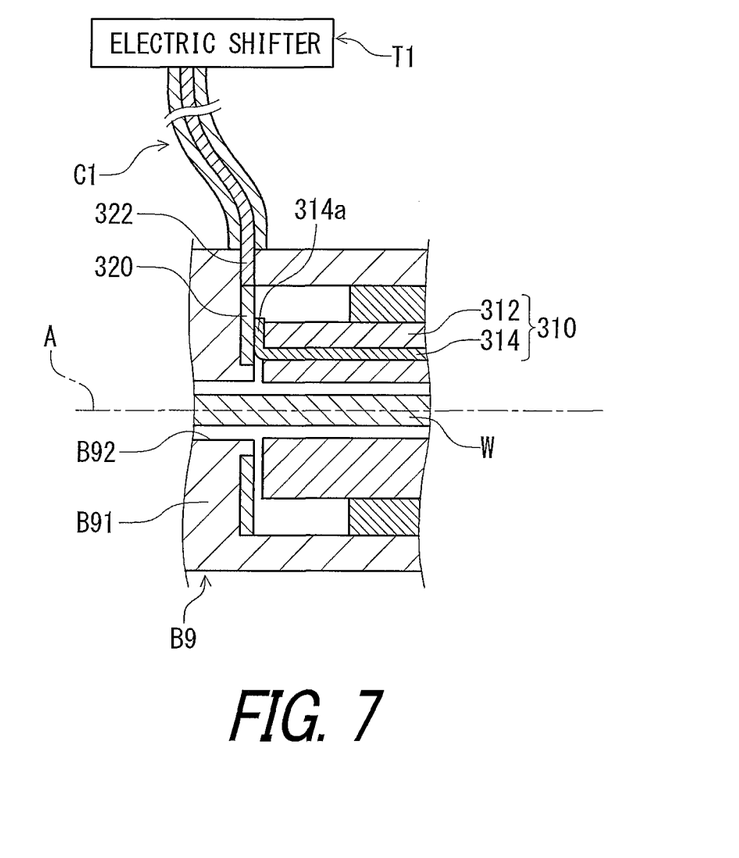
FIG. 7 is a cross-sectional view of a connecting structure between a brake operating device and the bicycle hose structure illustrated in FIG. 6.

As seen in FIG. 7, an additional electrical conductor 320 is attached to a housing B91 of a brake operating device B9. The additional electrical conductor 320 is provided around a wire opening B92 of the housing B91. An end portion 314a of the first electrical conductor 314 is in contact with the additional electrical conductor 320 in a state where the bicycle hose structure 310 is attached to the brake operating device B9. The end portion 314a is provided between the tubular main body 312 and the additional electrical conductor 320. The additional electrical conductor 320 is electrically connected to an additional electric wire 322 provided in the housing B91. The additional electric wire 322 extends from the additional electrical conductor 320 to an outside of the brake operating device B9. The additional electric wire 322 is included in the first electrical cable C1a and is electrically connected to a switch (not shown) of an electric shifter T1.

Since the bicycle hose structure 310 includes the tubular main body 312 and the first electrical conductor 314, the bicycle hose structure 310 can be used as a hose element and an electrical cable. Accordingly, at least part of an electrical cable can be integrated with a hose element, allowing the wiring arrangement to be simplified in a bicycle.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and"element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hose structure comprising:
    a tubular main body defining a through-hole, an inner peripheral surface and an outer peripheral surface, the through-hole being configured to arrange a force transmitting element provided so as to transmit operating force, the tubular main body having a center axis;
    a first electrical conductor provided at least radially inwardly of the outer peripheral surface and having an end portion configured to be electrically connected to a bicycle component, the first electrical conductor extending along the center axis of the tubular main body; and
    an attachment member configured to be attached to an end portion of the tubular main body and to be electrically connected to the first electrical conductor, wherein
    the attachment member includes an insertion portion and a flange portion,
    the insertion portion is provided in the through-hole of the tubular main body to be in direct contact with the end portion of the first electrical conductor,
    the flange portion is provided at an end of the insertion portion, the flange portion extends radially outward beyond an outermost circumferential surface of the insertion portion, the flange portion having a first axial end and a second axial end facing in opposite directions along the center axis, the first axial end being in direct contact with the end of the insertion portion, the flange portion is provided outside of the through-hole of the tubular main body along an axial direction defined along the center axis of the tubular main body, and
    the flange portion has an end surface on the second axial end to be in direct contact with an additional conductive member of the bicycle component such that the end portion of the first electrical conductor is electrically connected to the bicycle component via the end surface.

2. The bicycle hose structure according to claim 1, wherein
    the first electrical conductor is provided on the inner peripheral surface of the tubular main body.

3. The bicycle hose structure according to claim 2, wherein
    the first electrical conductor is bonded to the inner peripheral surface.

4. The bicycle hose structure according to claim 2, wherein
    the first electrical conductor comprises a first conductive film provided on the inner peripheral surface to cover the inner peripheral surface.

5. The bicycle hose structure according to claim 2, further comprising:
    a second electrical conductor radially outwardly provided with respect to the first electrical conductor to be electrically insulated from the first electrical conductor by the tubular main body.

6. The bicycle hose structure according to claim 5, wherein
    the second electrical conductor is provided on the outer peripheral surface of the tubular main body.

7. The bicycle hose structure according to claim 5, wherein
    the second electrical conductor comprises a second conductive film provided on the outer peripheral surface to cover the outer peripheral surface.

8. The bicycle hose structure according to claim 1, wherein
    the first electrical conductor is at least partially embedded in the tubular main body.

9. The bicycle hose structure according to claim 1, wherein
    the first electrical conductor comprises a tubular member, and
    the tubular main body is configured to radially outwardly cover the first electrical conductor.

10. The bicycle hose structure according to claim 1, wherein
    the through-hole comprises a fluid passageway through which hydraulic fluid is to transmit the operating force as the force transmitting element.

11. The bicycle hose structure according to claim 10, wherein the attachment member includes an interior passageway configured to fluidly communicate with the fluid passageway in a state where the attachment member is attached to the end portion of the tubular main body.

12. The bicycle hose structure according to claim 1, wherein
the through-hole comprises a wire passageway through which a mechanical operation wire is to extend to transmit the operating force as the force transmitting element.

13. The bicycle hose structure according to claim 1, wherein
the first electrical conductor is at least partially exposed from the inner peripheral surface of the tubular main body to the through-hole of the tubular main body.

14. The bicycle hose structure according to claim 1, wherein
the end surface is farther from the tubular main body than the end portion of the first electrical conductor in the axial direction.

15. The bicycle hose structure according to claim 1, wherein
the flange portion is integrally provided with the insertion portion as a one-piece unitary member.

16. The bicycle hose structure according to claim 1, wherein
the insertion portion is in direct contact with the inner peripheral surface of the tubular main body.

17. The bicycle hose structure according to claim 16, wherein
the first electrical conductor is provided on the inner peripheral surface of the tubular main body.

18. The bicycle hose structure according to claim 1, wherein
the first electrical conductor is provided on an innermost surface of the tubular main body.

19. The bicycle hose structure according to claim 1, further comprising:
an insulating member provided directly sandwiched between the flange portion and the end portion of the first electrical conductor.

20. The bicycle hose structure according to claim 19, wherein
the insulating member is provided on a surface on the first axial end of the flange portion and extends radially from an inner peripheral edge of the flange portion to an outer peripheral edge of the flange portion.

21. The bicycle hose structure according to claim 1, wherein
the end surface of the flange portion is a furthest terminal end of the attachment member along the axial direction defined along the center axis.

22. The bicycle hose structure according to claim 1, wherein
the end surface of the flange portion extends in a radial direction and is configured to abut directly against a radially extending surface of the first electrical conductor.

23. A bicycle hose structure comprising:
a tubular main body defining a through-hole, an inner peripheral surface and an outer peripheral surface, the through-hole being configured to arrange a force transmitting element provided so as to transmit operating force, the tubular main body having a center axis;
a first electrical conductor provided at least radially inwardly of the outer peripheral surface and having an end portion configured to be electrically connected to a bicycle component, the first electrical conductor extending along the center axis of the tubular main body; and
an attachment member configured to be attached to an end portion of the tubular main body and to be electrically connected to the first electrical conductor, wherein
the attachment member includes an insertion portion and a flange portion,
the insertion portion is provided in the through-hole of the tubular main body to be in direct contact with the end portion of the first electrical conductor,
the flange portion is provided at an end of the insertion portion, the flange portion extends radially outward beyond an outermost circumferential surface of the insertion portion, the flange portion having a first axial end and a second axial end facing in opposite directions along the center axis, the first axial end being in direct contact with the end of the insertion portion, the flange portion is provided outside of the through-hole of the tubular main body along an axial direction defined along the center axis of the tubular main body, and
the flange portion has an end surface on the second axial end to be in direct contact with an additional conductive member of the bicycle component such that the end portion of the first electrical conductor is electrically connected to the bicycle component via the end surface, and
the end surface of the flange portion is farther from the tubular main body than the end portion of the first electrical conductor in the axial direction.

24. The bicycle hose structure according to claim 23, wherein
the first electrical conductor is provided on an innermost surface of the tubular main body.

25. The bicycle hose structure according to claim 23, further comprising:
an insulating member provided directly sandwiched between the flange portion and the end portion of the first electrical conductor.

26. The bicycle hose structure according to claim 25, wherein
the insulating member is provided on a surface on the first axial end of the flange portion and extends radially from an inner peripheral edge of the flange portion to an outer peripheral edge of the flange portion.

27. The bicycle hose structure according to claim 23, wherein
the end surface of the flange portion is a furthest terminal end of the attachment member along the axial direction defined along the center axis.

28. The bicycle hose structure according to claim 23, wherein
the end surface of the flange portion extends in a radial direction and is configured to abut directly against a radially extending surface of the first electrical conductor.

* * * * *